United States Patent [19]

Bielsker

[11] Patent Number: 5,784,361
[45] Date of Patent: Jul. 21, 1998

[54] BI-DIRECTIONAL ASYNCHRONOUS TELECOMMUNICATION AUDIO SIGNAL PROCESSING

[75] Inventor: Barry H. Bielsker, Vienna, Va.

[73] Assignee: Coherent Communications Systems Corp., Leesburg, Va.

[21] Appl. No.: 792,293

[22] Filed: Jan. 31, 1997

[51] Int. Cl.[6] .................................................. H04B 3/20
[52] U.S. Cl. ............................................................ 370/286
[58] Field of Search ................................. 370/286, 201, 370/289, 290, 291, 503; 379/410, 406, 411; 375/354

[56] References Cited

U.S. PATENT DOCUMENTS

| | | |
|---|---|---|
| 4,891,801 | 1/1990 | Marcos et al. |
| 5,005,168 | 4/1991 | Cummiskey et al. ............ 370/286 |
| 5,113,389 | 5/1992 | Cox ................................. 379/410 |
| 5,495,473 | 2/1996 | Cox ................................. 370/286 |
| 5,594,719 | 1/1997 | Oh et al. ......................... 379/410 |

*Primary Examiner*—Ajit Patel
*Attorney, Agent, or Firm*—Dann, Dorfman, Herrell & Skillman, P.C.

[57] ABSTRACT

An apparatus is provided for digital signal processing of telecommunication signals along respective transmit and receive paths of a two-way telecommunication link. The respective transmit and receive signals each include an audio data component and a timing component. Digital signal processing of at least one of the signals, such as an echo cancellation, employs information derived from the audio data component of the other signal. To compensate for differences between the respective timing components of the signals, resynchronization of each signal in terms of the timing component of the other signal is performed prior to modifying the audio data component of the other signal.

17 Claims, 1 Drawing Sheet

BI-DIRECTIONAL ASYNCHRONOUS TELECOMMUNICATION AUDIO SIGNAL PROCESSING

FIELD OF THE INVENTION

The present invention relates to audio signal processing applied to telecommunication signals having differing temporal components. In particular, the invention relates to the use of an information component, such as audio data, contained in each of two respective signals travelling in opposite directions through a bi-directional telecommunication link, to influence processing of the other signal.

BACKGROUND

Digital signals utilized in telecommunication networks are typically encoded in a "line code" format that combines an information component, such as an audio data component, and a timing component. Pulse-code modulation (PCM) is the most common type of line code in standard telecommunication networks, although other types of line codes are known. Timing signals for telecommunication networks are generated by highly accurate sources, such as atomic clocks tuned to prescribed frequencies. However, the respective timing components of signals constituting a two-way communication link often exhibit variations relative to one or more temporal parameters (synchronization, phase, frequency, etc.). Such a variation can be static, periodic, or monotonic depending on the cause of the variation. For example, periodic drift between the timing components of two telecommunication signals can be caused by the respective send and receive path signals having timing components derived from separate master clocks.

Another source of periodic relative drift arises from the use of geosynchronous satellites to relay telecommunication signals along a portion of the communication link. Ideally, a geosynchronous satellite would be positioned directly above the equator in order to remain at a fixed azimuth relative to an earth station. In practice, geosynchronous satellites are positioned on orbital paths that are inclined relative to the equator. From the perspective of an earth-bound observer, the satellite dips below the celestial equator for twelve hours each day, and rises above the celestial equator for twelve hours each day. The resulting daily oscillation of the path length between a transmitting earth station and a receiving earth station, is detectable as an oscillation in the timing component of a line-coded signal transmitted from one earth station to the other. During half of the day, the path length decreases, causing an increase in the apparent timing frequency. During the other half of the day, the path length increases, causing a decrease in the apparent timing frequency, in a manner analogous to the shift in tone from the whistle of a passing locomotive.

Variations in the timing component of a telecommunication signal, in general, have an insignificant impact on faithful transmission and reproduction of the signal in a single direction. Because a line coded signal contains its own internal timing component, the signal can be decoded and converted to a desired terminal format at a rate determined by the timing component. It has been determined that there are situations where discrepancies between the timing components of signals carrying respective sides of a two-way communication can undesirably impair the performance of desired audio processing of the signals. In particular, it would be desirable to make corrections for such timing discrepancies in situations where the information component of each of respective send and receive signals is altered or modified on the basis of a property of the information component of the other of the respective signals. It would further be desirable to perform such processing in a manner that maintains the integrity of each of the timing components of the respectively processed send and receive signals.

For example, in echo cancellation, a digital signal processor is ordinarily connected to receive a first input signal for transmission in one direction, and a second input signal for transmission in an opposite direction. The digital signal processor is configured to estimate an impulse response of an echo path and to generate an estimated echo signal by convolving the first input signal with the impulse response. Then, the estimated echo signal is subtracted from the second input signal to provide an output signal that is substantially free of echo. Such echo cancellation can be performed on a wideband or subband basis, and can be combined with other audio conditioning functions such as background audio noise injection, automatic gain control, automatic equalization, dynamic range compression or expansion, or other alterations of audio content that provide enhancement or improvement of the telecommunication signal audio quality. Accurate echo cancellation requires the simultaneous retrieving of information about signals propagating in opposite directions, but such signals may possess timing discrepancies relative to one another.

SUMMARY OF THE INVENTION

In accordance with one aspect of the present invention, there is provided a signal processing system for receiving, processing, and transmitting respective line coded send and receive telecommunication signals along respective send and receive paths of a bidirectional telecommunication link. The signal processing system receives a send path signal as a send-input signal, and separates the send-input signal into a send path timing component and a send-input information component. Similarly, the receive path signal is separated into a receive path timing component and a receive-input information component.

The receive path information component is provided to a receive path signal processor, which is operated at a rate determined by the receive path timing component. The receive path information component is also stored into a receive path resynchronization buffer at a rate determined by the receive path timing component. The send path information component is provided to a send path signal processor, which is operated at a rate determined by the send path timing component. The send path information component is also stored into a send path resynchronization buffer at a rate determined by the send path timing component.

The receive path signal processor is connected with the send path resynchronization buffer to retrieve the send path information component from the buffer at a rate determined by the receive path timing component. Similarly, the send path signal processor is connected with the receive path resynchronization buffer to retrieve the receive path information component from the buffer at a rate determined by the send path timing component. In this manner, the respective signal processors are each provided with the information components of the send path signal and the receive path signal respectively, such that the information components of the respective signals have been resynchronized to the timing component of the other signal, for each signal processor.

The send path signal processor is configured to alter the send path information component on the basis of a property derived from the resynchronized receive path information component, to provide a processed send path information component. The processed send path information component is then provided to a line coder to be combined with the send path timing component for transmission as a line coded signal in the send direction of the communication link.

The receive path signal processor is configured to alter the receive path information component on the basis of a property derived from the resynchronized send path information component, to provide a processed receive path information component. The processed receive path information component is then provided to a line coder to be combined with the receive path timing component for transmission as a line coded signal in the receive direction of the communication link.

It will be appreciated that the signal processing system of the present invention provides for signal processing of non-synchronized bi-directional telecommunication signals, such that the processing of each of the two signals is influenced by the information contents of their respective counterpart signals. Moreover, the integrity of the timing components in each direction is maintained because the processed send signal retains the timing component of the unprocessed send path signal, and the processed receive signal retains the timing component of the unprocessed receive signal.

BRIEF DESCRIPTION OF THE DRAWING

The foregoing summary, and the following detailed description will best be understood in connection with the attached drawing in which.

DETAILED DESCRIPTION OF THE INVENTION

Figure 1:
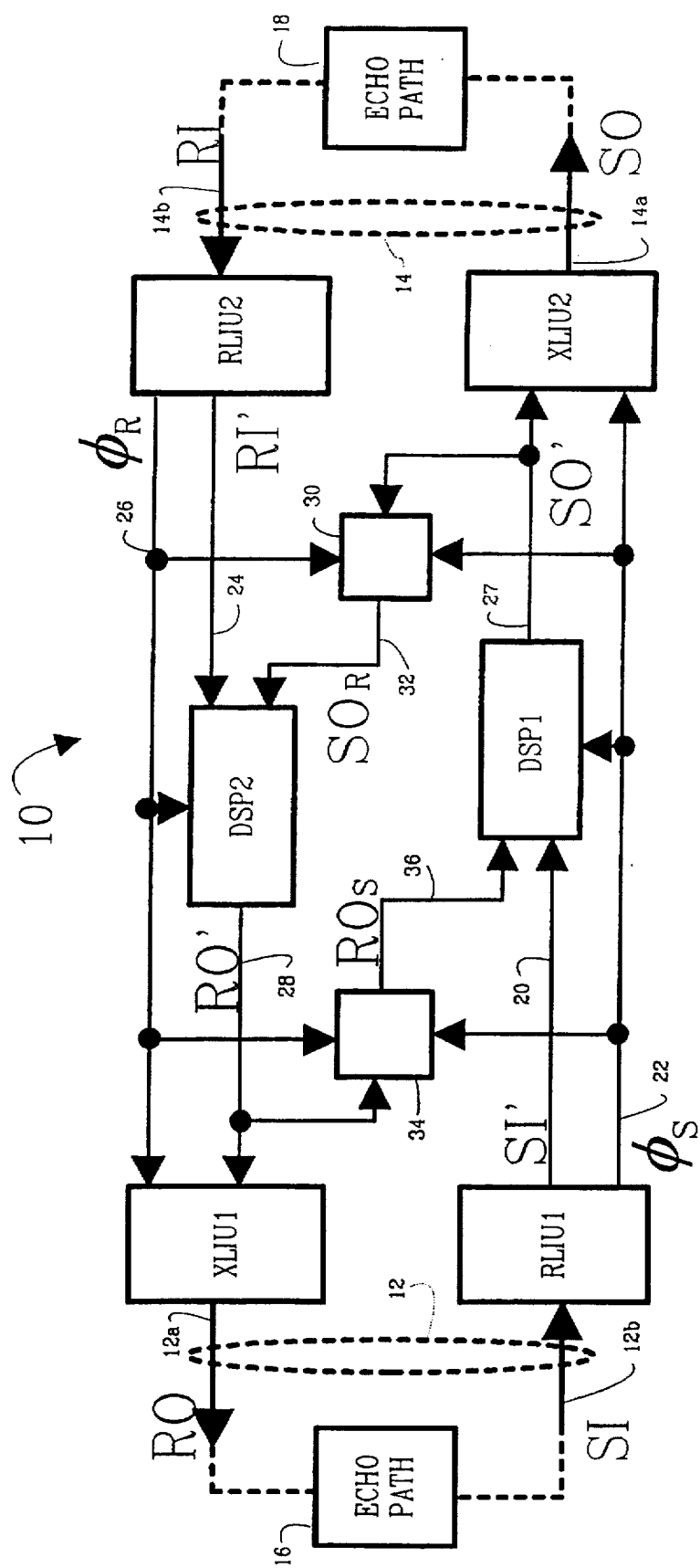
FIG. 1 is a functional block diagram of a signal processing system in accordance with the present invention.

Referring now to FIG. 1, there is shown a bi-directional telecommunication signal processing system 10 configured in accordance with a preferred embodiment of the invention. The signal processing system includes a near-end terminal 12 and a far-end terminal 14, for connection along a telecommunication link. The terms "near-end" and "far-end" are here used for the purpose of differentiating the two sides of the signal processing system, and are not intended to connote physical proximity to either side of a telecommunication link. Also for purposes of description, the direction of signal transmission from the far end to the near end shall be defined as the "receive path", and the opposite direction shall be defined as the "send path".

The telecommunication link is configured to operate according to a protocol wherein signals transmitted along the link comprise a timing component and an information component. In the preferred embodiment, the telecommunication link is a virtual or physical "4-wire" PCM link. In other embodiments, the telecommunication link protocol can be a pocket transmission protocol, such as the X.25 protocol, a frame relay protocol, an asynchronous transfer mode (ATM) protocol, a time-division multiplexed protocol, or other known data and timing transmission protocols. The information component of a signal transmitted in either direction on the link may comprise audio data, such as voice data, or other data such as modem signals, fax signals, still or motion video signals, or other information-bearing digital data. The following description of an exemplary embodiment shall refer to audio data as a representative information component.

The near-end terminal 12 includes a receive-output terminal 12a for transmitting a receive-output signal (RO) along the receive path to a near end station (not shown). The RO signal is preferably a pulse-code modulated signal of a standard type employed in telecommunication networks for encoding and transmitting audio signals, such as speech. The near end station typically includes a PCM decoder, a hybrid, and other such equipment for delivering the audio component of the RO signal to a near-end user having a telephone. An audio signal transmitted from the near-end user is similarly encoded as a send-input signal (SI) for transmission along the send path to a send-input terminal 12b of the near-end terminal 12. The audio component of the SI signal includes an echo component in addition to audio signals produced by the near-end user, such as speech. The echo component of SI can be generated by such phenomena as acoustic coupling of the audio component of the RO signal into the audio component of the SI signal at the near-end user's terminal, hybrid reflection, satellite transmission delay, coding/decoding delay, or other sources of echo. For purposes of explanation, such sources of echo are represented in FIG. 1 as echo path 16.

The far-end terminal 14 includes a send-output terminal 14a for transmitting a send-output signal (SO) along the send path to a far-end station (not shown). The SO signal is preferably a PCM signal. The far-end station typically includes a PCM decoder, a hybrid, and other such equipment for delivering the audio component of the SO signal to a far-end user having a telephone. An audio signal transmitted from the far-end user is encoded as a receive-input signal (RI) for reception along the receive path at a receive-input terminal 14b of the far-end terminal 14. The RI signal also includes an echo component due to an echo path 18 between the send-output terminal 14a and the receive-input terminal 14b.

The send-input terminal 12b is connected to an input of a receive line interface unit, RLIU1, of the signal processing system 10. RLIU1 is configured to extract an audio component and a timing component from the SI signal and to provide (i) a send-input audio data signal SI' as an output on signal line 20, and (ii) a send path timing signal $\phi_S$ as an output on signal line 22. Similarly, the receive-input terminal 14b is connected to an input of a receive line interface unit, RLIU2. RLIU2 is configured to extract an audio component and a timing component from the RI signal and to provide (i) a receive-input audio data signal RI' as an output on signal line 24, and (ii) a receive path timing signal $\phi_R$ as an output on signal line 26.

Signal line 20 is connected to provide the SI' signal as an input to a digital signal processor, DSP1. DSP1 is configured to alter or modify an audio characteristic of the SI' signal and to provide the processed signal, at an output signal line 27, as send-output audio data signal SO'. DSP1 is connected to signal line 22 to receive $\phi_S$ as a timing control input, so that the audio modification function of DSP1, and generation of the SO' signal, is performed at a rate determined by the timing component of the SI signal. The SO' signal and $\phi_S$ are connected, via signal line 27 and signal line 22 respectively, with corresponding input terminals of a transmit line interface unit XLIU2. XLIU2 is configured to combine and encode SO' and $\phi_S$ into a PCM output signal, SO, at terminal 14a for transmission along the send path to the far-end station. Hence, the timing component of SO is identical to the timing component of SI.

Signal line 24 is connected to provide the RI' signal as an input to a digital signal processor, DSP2. DSP2 is configured to alter or modify an audio characteristic of the RI' signal and to provide the processed signal, at an output signal line 28, as receive-output audio data signal RO'. DSP2 is connected to signal line 26 to receive $\phi_R$ as a timing control input, so that the audio modification function of DSP2, and the generation of the RO' signal, is performed at a rate determined by the timing component of the RI signal. The RO' signal and $\phi_R$ are connected, via signal line 28 and signal line 26 respectively, with corresponding input terminals of a transmit line interface unit XLIU1. XLIU1 is configured to combine and encode RO' and $\phi_R$ into a PCM output signal, RO, at terminal 12a for transmission along the receive path to the near-end station.

Although international telecommunications standards prescribe strict timing requirements for transmission of PCM signals, the receive path timing signal $\phi_R$ and the send path timing signal $\phi_S$ may differ in their respective temporal parameters such as phase or frequency. Such timing discrepancy can undesirably interfere with the audio processing performed by the receive path signal processor (DSP2) or by the send path signal processor (DSP1), for any modification of the audio component of the send path signal or the receive path signal wherein such modification requires data pertaining to the audio component of the signal propagating along the counterpart signal path.

In an embodiment where DSP2 is configured to remove the echo component of the RI signal, then DSP2 is provided with the audio component of the SO signal synchronized with the timing component of the RI signal. This objective is met in the preferred embodiment by providing SO' and $\phi_S$ as inputs to a re-synchronization buffer 30. The re-synchronization buffer 30 contains a first-in, first-out (FIFO) memory for receiving and storing the SO' signal at a rate determined by $\phi_S$. Such a buffer can be provided, for example, by a Mitel 8979 Framer integrated circuit. Signal line 26 is connected with the buffer 30 to provide $\phi_R$ as a timing input to the buffer 30 for reading data out of the FIFO memory. The resulting re-synchronized signal, designated in FIG. 1 as $SO_R$, is then transmitted along signal line 32 as an input to DSP2. In this way, the audio component of a send path signal is provided to a signal processor at a rate determined by the timing component of a counterpart receive path signal.

DSP2 is programmed to estimate the impulse response of echo path 18, to convolve the estimated impulse response with $SO_R$, and to subtract the result of the convolution from RI'. Because $SO_R$ is provided as a re-synchronized representation of the audio content of the SO signal, the timing of operations performed within DSP2 is effectively controlled by the timing component $\phi_R$ of the receive path signal.

Similarly, DSP1 can be configured to remove the echo component of the SI signal in synchronism with the timing component of the SI signal. RO' and $\phi_R$ are provided as input signals to a re-synchronization buffer 34. The re-synchronization buffer 34 is connected with signal line 26 to receive and store the RO' signal at a rate determined by $\phi_R$. Signal line 22 is connected with the buffer 34 to provide $\phi_S$ as a timing input to the buffer 34 for reading data out of the buffer 34. The resulting re-synchronized signal, designated in FIG. 1 as $RO_S$, is then provided from buffer 34 along signal line 36 as an input to DSP1.

DSP1 is programmed to estimate the impulse response of echo path 16, to convolve the estimated impulse response with $RO_S$, and to subtract the result of the convolution from SI'. Because $RO_S$ is provided as a re-synchronized representation of the audio content of the RO signal, the timing of operations performed within DSP2 is effectively controlled by the timing component $\phi_S$ of the receive path signal.

In other applications, it may be desirable to provide a re-synchronized representation of the unprocessed audio component of the RI signal as an input to DSP1 in addition, or as an alternative, to the re-synchronized signal $RO_S$. That objective can be accomplished by connecting a resynchronization buffer to receive RI' at a rate determined by $\phi_R$, and further connected to provide an output signal to DSP1 at a rate determined by $\phi_S$. Similarly, a resynchronized representation of the unprocessed audio content of the SI signal can be provided to DSP2 by connecting a resynchronization buffer to receive SI' at the $\phi_S$ rate, and to provide an output signal to DSP2 at the $\phi_R$ rate.

It will be appreciated that the principles of the present invention are generally applicable to any desired audio processing of respective send path and receive path signals, wherein the audio processing applied to each signal is dependent upon the audio component of the other signal or of the processed version of the other signal.

That which is claimed is:

1. A method of processing telecommunication signals between a near end station and a far end station, comprising the steps of:

receiving, from the near end station, a send path signal having a send path information component and a send path timing component;

separating the send path signal into (i) a send path information data signal representing the send path information component, and (ii) a send path timing signal representing the send path timing component;

receiving, from the far end station, a receive path signal having a receive path information component and a receive path timing component;

separating the receive path signal into (i) a receive path information data signal representing the receive path information component, and (ii) a receive path timing signal representing the receive path timing component;

resynchronizing the send path information data signal with the receive path timing signal to provide a resynchronized send path information data signal;

altering a characteristic of the send path information data signal with a signal processor operated at a rate controlled by the send path timing signal, to provide a processed send path information data signal;

altering a characteristic of the receive path information data signal with reference to the resynchronized send path information data signal, with a signal processor operated at a rate determined by the receive path timing signal, to provide a processed receive path audio information signal;

combining the processed send path information data signal with the send path timing signal, to provide a processed send path signal;

combining the processed receive path information data signal with the receive path timing signal, to provide a processed receive path signal;

transmitting the processed send path signal to the far end station; and transmitting the processed receive path signal to the near end station.

2. The method of claim 1, wherein the step of altering a characteristic of the send path information data signal comprises canceling echo from the said path information data signal.

3. The method of claim 2, wherein the step of altering a characteristic of the receive path information data signal comprises canceling echo from the receive path information data signal.

4. The method of claim 3, wherein the information components of each of the respective send and receive path signals comprises audio information.

5. The method of claim 1, comprising the step of resynchronizing the receive path information data signal with the send path timing signal to provide a resynchronized receive path information data signal, and wherein the step of altering a characteristic of the send path information data signal is performed with reference to the resynchronized receive path information data signal.

6. The method of claim 5, wherein the step of altering a characteristic of the send path information data signal comprises canceling echo from the send path information data signal, and wherein the step of altering a characteristic of the receive path information data signal comprises canceling echo from the receive path in formation data signal.

7. An apparatus for processing a respective send path signal and a receive path signal transmitted along respective send and receive paths in a two-way telecommunication system, comprising:

- a receive-input terminal for receiving the receive path signal;
- a first receive path interface for separating the receive path signal into a respective timing component and an information component;
- a first send-input terminal for receiving the send path signal;
- a send path interface for separating the send path signal into a respective timing component and an information component;
- a receive path signal processor for altering a characteristic of the receive path information component at a rate determined by the receive path timing component to provide a processed receive path information signal;
- a resynchronization buffer connected to receive the processed receive path information signal and the send path timing component, to provide a resynchronized receive path information signal;
- a send path signal processor for altering a characteristic of the send path information component with reference to the resynchronized receive path information signal, at a rate determined by the send path timing component, to provide a processed send path information signal;
- a second receive path interface for combining the processed receive path information signal with the receive path timing component for transmission along the receive path; and
- a second send path interface for combining the processed send path information signal with the send path timing component for transmission along the send path.

8. The apparatus of claim 7, wherein the send path signal processor comprises an echo canceler.

9. The apparatus of claim 8, wherein the receive path signal processor comprises an echo canceler.

10. The apparatus of claim 7, comprising a second resynchronization buffer connected to receive the processed send path information signal and the receive path timing component to provide a resynchronized send path information signal; and wherein the receive path signal processor is connected to receive the resynchronized send path information signal to alter the characteristic of the receive path information component with reference to the resynchronized send path information signal.

11. The apparatus of claim 10, wherein the respective send and receive path signal processors comprise echo cancelers.

12. An apparatus for processing respective send and receive signals in a two-way telecommunications system having send path and a receive path, wherein each of said send and receive signals comprises an information component and a timing component, the apparatus comprising:

- a receive path processor, connected along the receive path, and operated at a rate determined by the receive signal timing component, for altering the information component of the receive signal to provide a processed receive signal along the receive path;
- resynchronizing means connected to receive at least one of the information component of the receive signal and the processed receive signal, for providing a resynchronized receive signal at a rate determined by the timing component of the send signal; and
- a send path processor, connected to receive the resynchronized receive signal, and operated at a rate determined by the send signal timing component, for altering the information content of the send signal according to information derived from the resynchronized receive signal to provide a processed send signal along the send path.

13. An apparatus for processing respective send and receive signals in a two-way telecommunications system having a send path and a receive path, wherein each of said send and receive signals comprises an information component and a timing component, the apparatus comprising:

- a receive path processor, connected along the receive path, and operated at a rate determined by the receive signal timing component, for altering the information component of the receive signal to provide a processed receive signal along the receive path;
- resynchronizing means connected to receive at least one of the information component of the receive signal and the processed receive signal, for providing a resynchronized receive signal at a rate determined by the timing component of the send signal; and
- a send path processor, connected along the send path and connected to receive the resynchronized receive signal, and operated at a rate determined by the send signal timing component, for altering the information content of the send signal according to information derived from the resynchronized receive signal to provide a processed send signal along the send path;
- second resynchronizing means connected to receive at least one of the information component of the send signal and the processed send signal, for providing a resynchronized send signal at a rate determined by the timing component of the receive signal; and
- wherein the receive path processor is configured to alter the information content of the receive signal according to the information derived from the resynchronized send signal.

14. The apparatus of claim 13, wherein the receive path processor and the send path processor are each configured to perform echo cancellation.

15. The apparatus of claim 13 wherein the resynchronizing means is connected to receive the processed receive signal, and wherein the second resynchronizing means is connected to receive the processed send signal.

16. The apparatus of claim 12 wherein the resynchronizing means is connected to receive the processed receive signal.

17. The apparatus of claim 16 wherein the receive path processor and the send path processor are each configured to perform echo cancellation.

* * * * *